US005913294A

United States Patent [19]

Takahashi et al.

[11] Patent Number: 5,913,294

[45] **Date of Patent: *Jun. 22, 1999**

[54] OUTBOARD MOTOR FUEL SUPPLY SYSTEM

[75] Inventors: Masanori Takahashi; Hitoshi Watanabe; Masaru Suzuki, all of Hamamatsu, Japan

[73] Assignee: Sanshin Kogyo Kabushiki Kaisha, Shizuoka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/758,165

[22] Filed: Nov. 25, 1996

[30] Foreign Application Priority Data

Nov. 24, 1995 [JP] Japan .................................... 7-329696

[51] Int. Cl.$^6$ ............................ F02M 39/00; F02K 31/01

[52] U.S. Cl. .................................... 123/198 DB; 123/516; 137/571

[58] Field of Search .................................... 123/516, 497, 123/198 DB, 198 D, 456; 137/571

[56] References Cited

U.S. PATENT DOCUMENTS

| | | | |
|---|---|---|---|
| 2,926,688 | 3/1960 | Muma | 137/571 |
| 2,953,156 | 9/1960 | Bryant | 137/566 |
| 2,998,056 | 8/1961 | Capehart | 137/571 |
| 4,252,094 | 2/1981 | Draxler | 123/198 D |
| 4,809,666 | 3/1989 | Baltz | 123/510 |
| 4,811,717 | 3/1989 | Nakahama | 123/509 |
| 5,036,822 | 8/1991 | Kojima | 123/510 |
| 5,095,880 | 3/1992 | Ricks | 123/198 DB |
| 5,197,444 | 3/1993 | Lang | 137/571 |
| 5,417,239 | 5/1995 | Ford | 137/571 |

FOREIGN PATENT DOCUMENTS

| | | | |
|---|---|---|---|
| 905703 | 9/1962 | United Kingdom | 123/510 |

*Primary Examiner*—Carl S. Miller
*Attorney, Agent, or Firm*—Knobbe, Martens, Olson & Bear LLP

[57] ABSTRACT

An outboard motor for a watercraft includes a simply structured fuel supply system of a smaller size and a longer life than prior fuel supply systems. The fuel supply system includes a delivery fuel tank carried by the outboard motor. Fuel is pumped from an external fuel supply tank carried by the watercraft to the delivery fuel tank by a low-pressure fuel pump located within the outboard motor. A control system controls the low-pressure fuel pump so that a predetermined level of fuel is maintained in the delivery fuel tank. The control system includes a fluid level detection sensor that detects the level of fuel within the delivery fuel tank and produces a corresponding signal indicative of the fuel level. A control unit circuit receives the fluid level signal and determines if the fluid level in the tank is higher or lower than a predetermined maximum fuel level. If the fluid level is determined to be higher than a maximum fuel level, the control unit circuit deactivates the low-pressure fuel pump. If the fluid level is determined to be lower than the maximum fuel level, the control unit circuit activates the low-pressure fuel pump.

29 Claims, 2 Drawing Sheets

OUTBOARD MOTOR FUEL SUPPLY SYSTEM

BACKGROUND OF THE INVENTION

1. Field of the Invention

The present invention relates in general to an internal combustion engine and in particular to a fuel supply system of an internal combustion engine.

2. Description of Related Art

A fuel supply system of an outboard motor's internal combustion engine typically includes an external supply fuel tank and a plurality of low-pressure fuel pumps that transfer fuel from the supply fuel tank to a delivery fuel tank located in the power head of the outboard motor. The fuel supply system also includes a high-pressure fuel pump that transfers fuel from the delivery fuel tank to the engine. The low-pressure fuel pump often is a diaphragm valve operated by the camshaft of the engine so that when the camshaft rotates, the valve moves. Alternatively, with a two-stroke, crankcase compression engine, a pressure fluctuation in an associated crankcase chamber drives the diaphragm valve. The valve's diaphragm movement causes the pressure in the pump to change, causing fuel to be pumped from the external supply tank to the delivery tank.

Diaphragm fuel pumps, however, suffer from a number of drawbacks. For instance, one drawback of diaphragm fuel pump is that the diaphragm tends to wear out. The diaphragm valve moves continuously as the camshaft rotates, or the pressure within the associated crankcase chamber fluctuates, regardless of the fuel needs of the delivery tank. The constant movement of the diaphragm causes the diaphragm to fatigue.

Diaphragm pumps also often fail to produce enough pressure to deliver a sufficient amount of fuel to the delivery tank when the engine runs for an extended period of time under high-fuel consumption conditions. If the delivery tank does not receive a sufficient amount of fuel from the low-pressure pump, the high-pressure pump will run dry. Running the pump dry damages the pump. An insufficient amount of fuel in the delivery tank also prevents the engine from receiving the desired amount of fuel. This affects the fuel/air ratio of the fuel charge delivered to the engine and can cause the engine to stall.

In an effort to supply the delivery tank with a sufficient amount of fuel, fuel supply systems commonly include several low-pressure diaphragm pumps. Multiple low-pressure fuel pumps, however, increase the size of the engine and overly complicate the arrangement and plumbing of the fuel delivery system.

The diaphragm valve in each of the pumps is made relatively large in order to produce enough pressure to deliver a sufficient volume of fuel to the delivery tank. The pump body also has a large size because it must accommodate the large diaphragm valve. Multiple, large low-pressure pumps increase the size of the power head. The power head of the outboard motor generally extends above the transom of the watercraft and, consequently, the power head produces aerodynamic drag on the watercraft as the watercraft speeds over the water. The size and shape of the power head directly affects the amount of drag produced. Thus, multiple, large low-pressure fuel pumps negatively increase the drag experienced by the outboard motor.

Another problem with multiple low-pressure fuel pumps is they tend to make the fuel supply system complicated. Each low-pressure fuel pump includes an inlet port and outlet port that communicates with a respective conduit. A fitting is provided for each port to ensure that the respective conduit is sealingly engaged with the port. Thus, the multiple low-pressure fuel pumps include two sets of conduits, a set of conduits leading to the low-pressure fuel pumps and a set leading from the fuel pumps. A connector arrangement is provided for each set of multiple conduits for merging the set of conduits into a single conduit. Each connector arrangement requires multiple fittings to ensure that the conduits sealingly engage the connector arrangement. The complex nature of this arrangement makes the arrangement difficult and expensive to assemble. The complex arrangement is also susceptible to fuel leakage because of the multitude of fluid connections in the arrangement.

SUMMARY OF THE INVENTION

A need therefore exists for a fuel supply system of an outboard motor that includes low-pressure fuel pump that does not wear out, supplies the delivery fuel tank with a sufficient amount of fuel, and is not too large or too complicated.

One aspect of the invention involves an outboard motor for a watercraft. The outboard motor includes a power head with an internal combustion engine. A delivery fuel tank, which contains fuel for operation of the engine, is carried by the outboard motor. A low-pressure fuel pump is adapted to communicate with an external supply fuel tank and communicates with the delivery fuel tank for delivering fuel from the external supply fuel tank to the delivery fuel tank. The low-pressure fuel pump is selectively operable so as to maintain a predetermined level of fuel within the delivery fuel tank. A high-pressure fuel pump is in fluid communication with the delivery fuel tank for delivering fuel from the delivery tank to the engine.

An additional aspect of the invention involves an outboard motor for a watercraft that includes a cowling member and an internal combustion engine that is contained within the cowling member. The outboard motor includes a delivery tank, which contains fuel for operating the engine, that is carried by the cowling member. A low-pressure fuel pump, which is adapted to communicate with an external supply fuel tank, communicates with the delivery fuel tank to deliver fuel from the external fuel tank to the delivery tank. A high-pressure fuel pump is in fluid communication with the delivery fuel tank for pumping fuel from the delivery tank for supply to the engine. The outboard motor includes means for selectively operating the low-pressure fuel pump so as to maintain a predetermined level of fuel in the delivery fuel tank.

Another aspect of the invention involves an outboard motor for a watercraft that includes a powerhead with an internal combustion engine. The outboard motor includes a delivery tank that contains fuel for operation of the engine. A fuel supply system, which includes a low-pressure fuel pump, supplies fuel to the delivery tank. A control system is provided for the fuel supply system and controls the low-pressure fuel pump so that the fuel level in the delivery tank is maintained at a predetermined level.

A further aspect of the invention involves a method for controlling the level of fuel in the fuel tank of an outboard motor. The method includes the steps of providing a low-pressure fuel pump in the outboard motor for supplying fuel to the fuel tank, detecting the fuel level in the fuel tank, activating the low-pressure fuel pump if the fuel level detected in the fuel tank rises above a predetermined maximum fuel level, and deactivating the low-pressure fuel pump if the fuel level detected in the fuel tank falls below the predetermined maximum fuel level.

BRIEF DESCRIPTION OF THE DRAWINGS

These and other features of the invention will now be described with reference to the drawings of a preferred embodiment which is intended to illustrate and not limit the invention, and in which.

DETAILED DESCRIPTION OF THE PREFERRED EMBODIMENT

Figure 1:
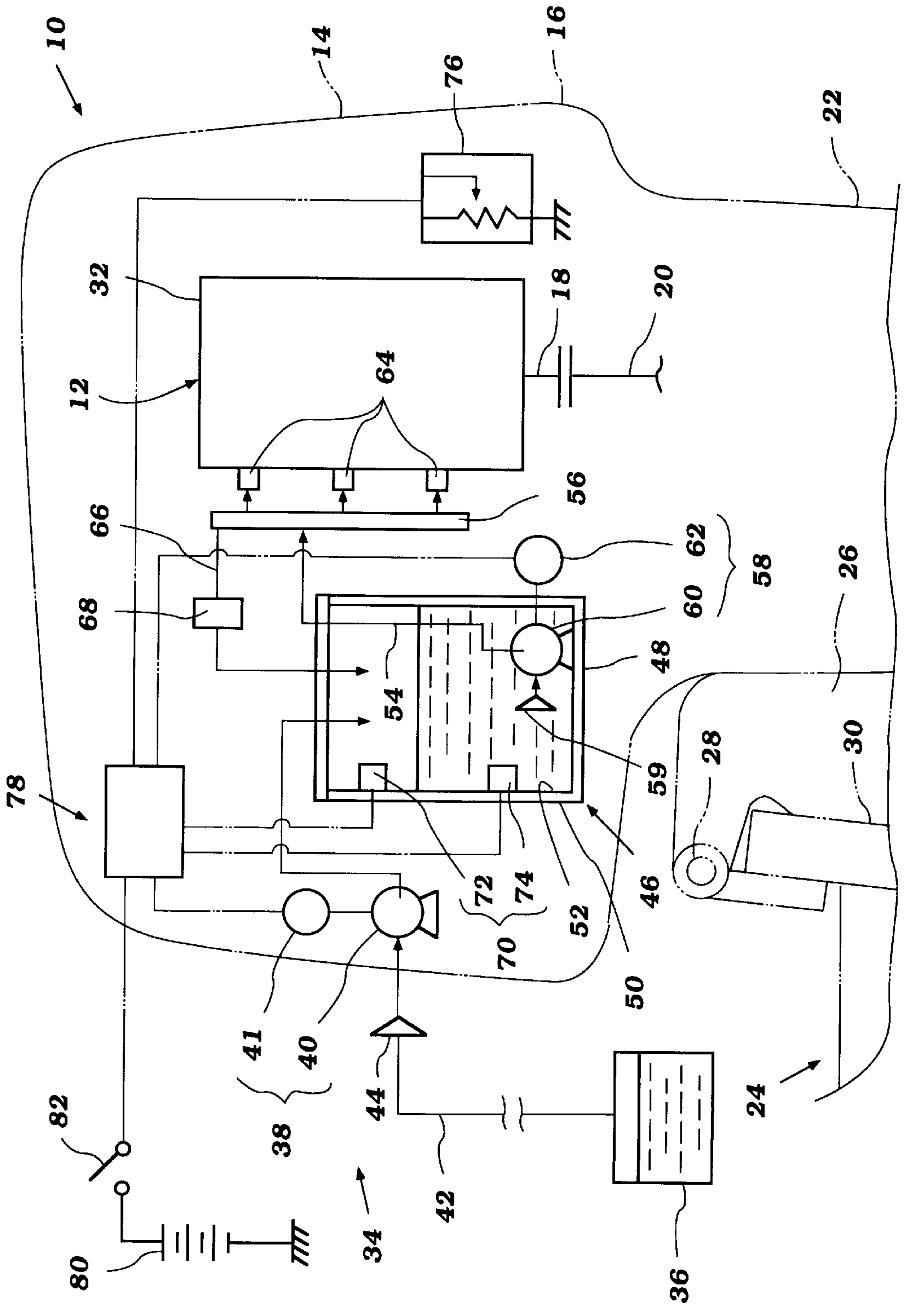
FIG. 1 is a schematic, partial side elevational view of an outboard motor and fuel supply system constructed in accordance with a preferred embodiment of the invention.

FIG. 1 illustrates an outboard drive 10 that incorporates a fuel supply system configured in accordance with a preferred embodiment of the present invention. The fuel supply system is described below in connection with an outboard motor 10 because the fuel supply system has particular utility with an outboard motor; however, the depiction of the invention in conjunction with an outboard motor is merely exemplary. Thus, those skilled in the art will readily appreciate that the fuel supply system of the present invention can be used with other types of watercraft engines as well.

The outboard motor 10 includes a powerhead that comprises a powering internal combustion engine 12 and a surrounding protective cowling. The cowling includes a main cowling portion 14 that is detachably connected to a tray portion 16. As is typical with outboard motor practice, the engine 12 is supported within the powerhead so that its output shaft, a crank shaft indicated by the reference numeral 18, rotates about a vertically extending axis. This output shaft or crankshaft 18 is rotatably coupled to a driveshaft 20 that depends into and is journaled within a driveshaft housing 22. Although not shown, the driveshaft 20 continues into a lower unit of the outboard motor 10 where it is selectively coupled to a propulsion device in a selected forward, neutral, or reverse operating condition so as to propel an associated watercraft 24.

As illustrated in FIG. 1, the outboard motor 10 includes a mounting arrangement for mounting the outboard motor 10 to a transom 25 of the watercraft 24. The mounting arrangement includes a clamping bracket 26 and a swivel bracket (not shown) that are pivotally connected through a trim pin 28. This arrangement permits tilting movement about a generally horizontally extending tilt axis defined by the trim pin 28. Although not shown, the mounting arrangement also permits steering movement of the outboard motor 10 about a vertically extending steering axis.

In order to facilitate the description of the present invention, the terms “front” and “rear” are used herein. “Front” refers to a side closest to the transom 25 of the watercraft 24, while “rear” refers to a side away from the transom 25.

In an exemplary embodiment, the engine 12 is a reciprocating multi-cylinder engine operating on a two-cycle, crankcase compression principle. The engine 12 preferably has a V-type configuration, though it will be readily apparent to those skilled in the art how the invention may be utilized with engines having other cylinder arrangements, such as, for example, in-line or slant cylinder arrangements, and operate on other than a two-cycle crankcase compression principle, such as, for example, a four-cycle principle.

The engine 12 includes a cylinder block assembly 32 that defines a plurality of crankcase chambers to which an air/fuel mixture is delivered from an induction system and a fuel supply system. An air charge of the air/fuel mixture is delivered to the crankcase chambers by the induction system, which may take any well-known form in the art. The fuel of the air/fuel mixture is supplied by a fuel supply system, indicated generally by the reference numeral 34.

The fuel supply system includes a supply fuel tank 36 that desirably is mounted within the hull of the associated watercraft 24. A low-pressure fuel pump 38 draws fuel from the supply fuel tank 36 through a supply line 42. The low-pressure fuel pump 38 is located within the main cowling portion 14. In the illustrated embodiment, the fuel pump 38 is an electrical on/off pump that includes a main pump body 40 and an electric motor 41. As is typical with fluid pumps, the main pump body 40 includes a moving fluid motivator that causes the pumping action of the pump 38.

A fuel filter 44 receives fuel from the supply fuel tank 36 as the pump 38 draws fuel through the supply line 42. The fuel filter 44 separates water and other contaminants from the fuel.

The low-pressure pump 38 pumps fuel from the fuel filter 44 and fuel tank 36 to a delivery fuel tank 46. The delivery fuel tank 46 stores fuel and acts as a vapor separator for separating fuel vapors and other gases form the liquid fuel. The delivery fuel tank 46 is formed by a tank housing 48 that includes an outer side 50 and inner side 52.

A high-pressure pump 58 pumps fuel from the delivery fuel tank 46 through a delivery conduit 54 to a fuel rail 56. The high-pressure pump 58 draws fuel from the delivery fuel tank 46 through a strainer 59 before delivering the fuel to the fuel rail 56. The strainer 59 strains any impurities remaining in the fuel before the fuel enters the fuel rail 56.

The high-pressure pump 58 includes a pump main body 60, which resides within the delivery fuel tank 46, and an electric motor 62. The pump main body 60 includes a moving fluid motivator that causes the pumping action of the pump 58.

The fuel rail 56, which desirably extends vertically, delivers fuel to a plurality of fuel injectors 64. Each fuel injector 64 supplies fuel to the air charge previously described near the inlets of the crankcase chambers.

A fuel return line 66 extends between an outlet port of the fuel rail 56 and the delivery fuel tank 46. The return line 86 completes a fuel flow loop that generally maintains a constant flow of fuel through the fuel rail 56. This constant fuel flow inhibits heat transfer to the fuel, and thus reduces fuel vaporization within the fuel rail 56. The fuel return line 66 includes a pressure regulator 68 for maintaining a uniform fuel pressure at the fuel injectors 64. The pressure regulator 68 regulates the fuel pressure by dumping excess fuel back to the delivery fuel tank 46, as is well known in the art.

A control system is provided for the fuel supply system 34 for maintaining the fuel level in the delivery tank 46 at a desired level. The control system includes a sensor arrangement that is indicated generally by the reference numeral 70. The sensor arrangement includes an upper fluid level detection sensor 72 and a lower fluid level detection sensor 74. Each sensor 72, 74 detects the fluid level in the tank 46 and produces a corresponding signal. The fluid level sensors 72, 74 are preferably located on the front, inner side 52 of the delivery fuel tank 46. The upper detection sensor 72 is provided at a vertical height that corresponds to the maximum height that the tank 46 can be filled where, regardless of the angle that the outboard motor 10 is tilted to, fuel will not leak from the top of the tank 46. The lower detection sensor 74 is provided at a vertical height that corresponds to the minimum height that the tank 46 can be filled where, regardless of the angle that the outboard motor 10 is tilted to, the high-pressure pump 58 will be able to pick up fuel in the tank 46.

The control system also includes an angle detection mechanism 76 that determines the angle of the delivery fuel tank 46 and produces a signal based on the angle determined. The angle detection mechanism 76 is carried by the outboard motor 10 and may take any well known form in the art, such as, for example, a mercury-type switch or a wiper arm/resistance winding arrangement.

The control system further includes a control unit circuit or logic circuit, indicated generally by the reference numeral 78. The control unit circuit 78 serves as the control center of the control system. The control unit circuit 78 is electrically connected to the fluid level sensors 72, 74 and angle detection mechanism 76 and receives the signals produced by these elements. A battery 80 is electrically connected to the control unit circuit 78 through a main power control switch 82 and supplies power to the control unit circuit 78. The battery 80 is grounded on a side of the battery 80 opposite to the switch 82. The battery 80 is charged by a generator (not shown) of the engine 12 in a well known manner. The switch 82 controls the supply of power to the circuit 78. The control unit circuit 78 is electrically connected to the electric pump motors 41, 62 for selectively operating the pumps 38, 58 in a manner described below.

Figure 2:
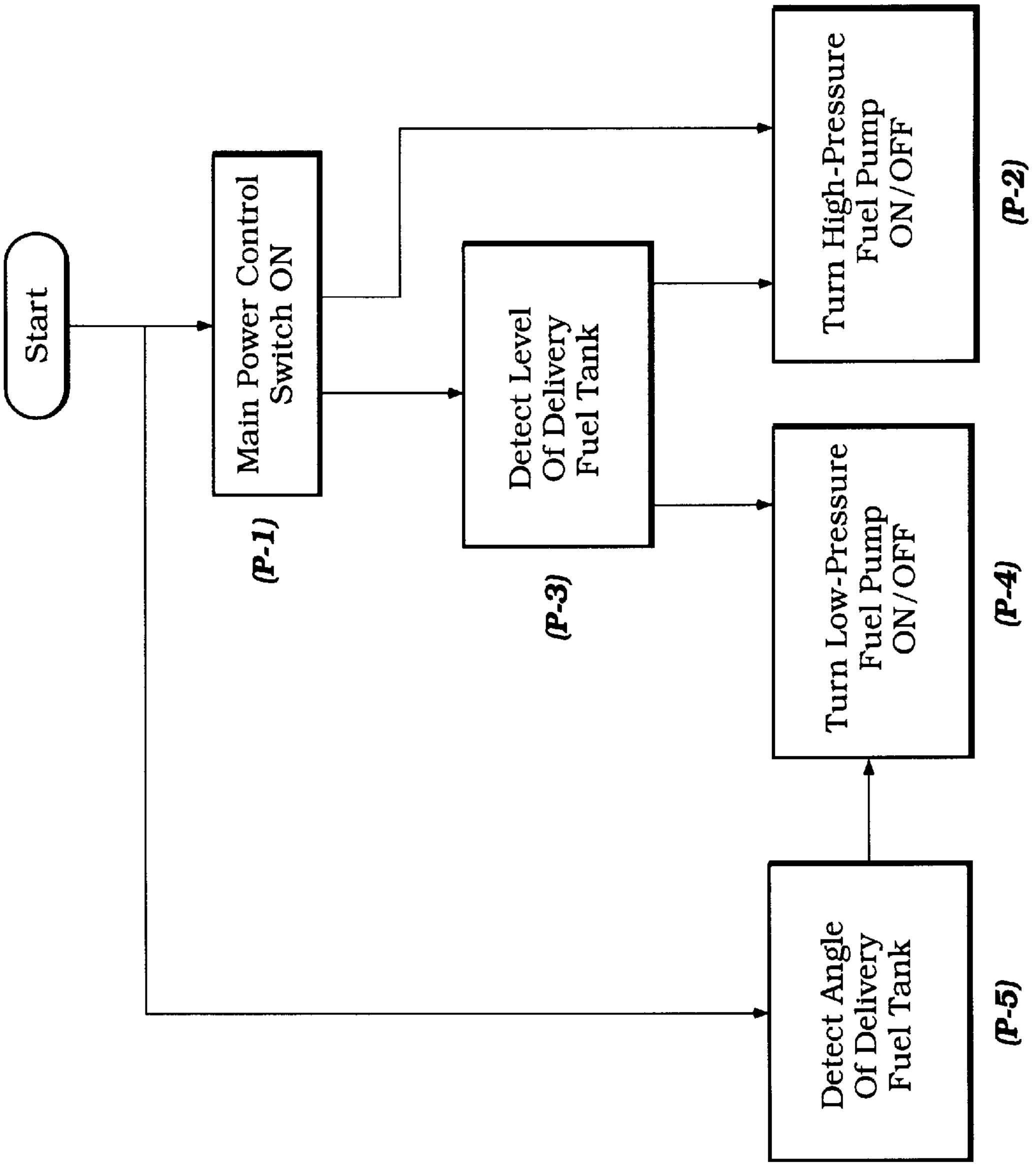
FIG. 2 is an operations chart illustrating how the low-pressure fuel pump and high-pressure pump of the present invention are preferably controlled.

With reference to FIGS. 1 and 2, and especially to the operations chart of FIG. 2, the manner in which the control system controls the fuel level in the delivery fuel tank 46 of the fuel supply system 34 will now be described. When the main switch 82 is closed or turned ON, as shown schematically in P-1, the high-pressure fuel pump 58 is operated or turned ON, assuming the control system determines that a sufficient amount of fuel is in the delivery tank 46, so that a sufficient amount of fuel is supplied to the fuel injectors 64 to facilitate starting of the engine. This is shown schematically in P-2.

As illustrated schematically in P-3, the fluid level in the delivery fuel tank 46 is detected by the sensors 72, 74 of the sensor arrangement 70. The upper detection sensor 72 senses the fluid level in the delivery fuel tank 46 and sends a corresponding signal to the control unit circuit 78. If the control unit circuit 78 determines that the fluid level in the delivery fuel tank 46 is higher than the predetermined maximum fuel level, the control unit circuit 78 does not supply power to the motor 41 of the low-pressure fuel pump 38. As a result, the low-pressure fuel pump 38 is turned OFF or maintained in an OFF state, as shown schematically by P-4. Whether the low-pressure fuel pump 38 is turned OFF or maintained in an OFF state will depend on the prior state of the pump 38. When the pump 38 is OFF, the fuel pump 38 is precluded from pumping fuel to the delivery tank 46, inhibiting fuel overflow or leakage from the tank 46. If the control unit circuit 78 determines that the fluid level in the delivery tank 46 is lower than the predetermined maximum fuel level, the control unit circuit 78 supplies the low-pressure fuel pump motor 41 with power. As indicated schematically by P-4, this supply of power causes the low-pressure fuel pump 38 to be turned ON or maintained in the ON position. Fuel is delivered to the delivery fuel tank 46 by the low-pressure pump 38 until the control system determines that the maximum fuel level has been exceeded.

In order to prevent the low-pressure pump 38 from continuously switching between an ON and OFF state as the fluid level in the delivery tank 46 continuously rises above and falls below the predetermined maximum fuel level, the control system is preferably equipped with a timing device that maintains the state of the low-pressure pump for a predetermined period of time. For example, if the fuel level falls below the predetermined maximum fuel level, the control system causes the low-pressure pump 38 to be turned ON. The timer in the control system causes the low-pressure pump 38 to be operated for a predetermined period of time regardless of the level of fuel in the tank 46. Thus, the pump 38 operates during this predetermined period of time even if the fuel level in the tank 46 falls below the maximum fuel level. This prevents the pump 38 from continuously switching between an ON and OFF state as the fluid level in the delivery tank 46 continuously rises and falls above the predetermined maximum fuel level.

In order to prevent the high-pressure pump 58 from running dry, the control system turns the high-pressure pump 58 off if the fluid level in the delivery tank falls below a predetermined minimum fuel level. As shown schematically by P-3, the lower detection sensor 74 detects the fluid level in the delivery fuel tank 46 and delivers a corresponding signal to the control unit circuit 78. If the control unit circuit 78 determines that the fluid level is higher than the predetermined minimum fuel level, the control unit 78 supplies power to the high-pressure pump motor 62. This causes the high-pressure fuel pump 58 to be turned ON or maintained in an ON state, as illustrated schematically by P-2, so that the fuel is delivered to the fuel rail 56. If the control unit circuit 78 determines that the fluid level is lower than the predetermined minimum fuel level, the control unit circuit 78 does not supply power to the high-pressure pump motor 62. Consequently, the high-pressure fuel pump 58 is turned OFF or maintained in the OFF state. Turning or maintaining the high-pressure fuel OFF when the fuel level falls below the predetermined minimum fuel level prevents the fuel pump 58 from running dry.

Changes in the tilt and trim position of the outboard motor 10 can significantly alter the level of the fuel in the delivery fuel tank 46 without changing the total volume of fuel in the delivery fuel tank 46. For this reason, it is desirable to position the sensors 72, 74 on the front inner side of the tank instead of on the rear inner side of the tank 46. Positioning the sensors 72, 74 on the front inner side of the tank 46 does more to inhibit fuel overflow and leakage from the top of the tank 46 when the outboard motor 10 is angled than positioning the sensors 72, 74 on the rear side of the tank 46. For example, if the delivery tank 46 contains a given volume of fuel and the outboard motor 10 is angled so that the fuel line is above the upper sensor 72, the control system will determined that the fluid level is above a predetermined upper vertical level and the low-pressure fuel pump 38 will be turned off, preventing the tank 46 from being overfilled and leaking. However, if the sensors 72, 74 are provided on the rear inner side of the tank 46, the fuel level may be below the upper sensor 72. As a result, the control system would determine that the fluid level is below a predetermined upper vertical level and would maintain the low-pressure fuel pump 38 in the ON position, filling the tank 46. Filling the delivery fuel tank 46 while the outboard is angled can cause the tank 46 to become overfilled and leak, especially if the outboard motor 10 is further angled.

Fuel overflow is further inhibited by the angle detection mechanism 76. When the main power control switch 82 is turned ON, the angle of the delivery fuel tank 46 is detected by the angle detection mechanism 76, as indicated schematically in P-5. The angle detection mechanism 76 produces a corresponding signal that the control unit circuit 78 receives. If the control unit circuit 78 determines the angle of the delivery fuel tank 46 is larger than a predetermined angle, the control unit circuit does not supply power to the low-pressure fuel pump motor 41 and the sensor arrangement 70 is deactivated by the control unit circuit 78. As a result, the low-pressure pump 38 is prevented from delivering fuel to the delivery fuel tank 46. When the delivery fuel tank 46 is provided at an angle that is less than the predetermined angle, the control unit circuit 78 activates the sensors 72, 74 so that the control system can control the fuel level of the delivery tank 46 in the aforementioned manner. Thus, the angle detection mechanism 76 provides additional protection against fuel overflow and leakage when the outboard motor 10 is angled.

The fuel supply system of the present invention prevents the problems with low-pressure diaphragm fuel pumps in the past. Selectively actuating the low-pressure fuel pump prevents the pump from operating unnecessarily and wearing out. Reducing the number and size of the low-pressure fuel pumps simplifies the fuel supply system and reduces the size of the power head. A simpler fuel supply system is easier and less expensive to assemble. Additionally, a simpler fuel supply system is less prone to leakage because less fluid connections are required. Reducing the size of the power head also causes less drag on the associated watercraft as watercraft travels across the water.

The selectively actuatable high-pressure fuel pump of the fuel supply system of the present invention is shut off when the fuel level of the delivery tank 46 is below a predetermined lower vertical level. This helps to maintain the fluid level in the fuel tank 46 at a desired level or range and prevents the high-pressure fuel pump from running dry.

Although this invention has been described in terms of a preferred embodiment, other embodiments apparent to those of ordinary skill in the art are also within the scope of this invention. Accordingly, the scope of the invention is intended to be defined only by the claims that follow.

What is claimed is:

1. An outboard motor for a watercraft, the motor comprising a power head having an internal combustion engine, a delivery fuel tank, which contains fuel for operation of the engine carried by the outboard motor, a low-pressure fuel pump adapted to communicate with an external fuel supply tank and in fluid communication with the delivery fuel tank to deliver fuel from the external supply tank to the delivery fuel tank, the low-pressure fuel pump being selectively operable so as to maintain a fuel level generally lower than a first predetermined level of fuel within the delivery fuel tank, a high-pressure fuel pump in fluid communication with the delivery fuel tank that pumps fuel from the delivery tank to the engine, the high-pressure pump being selectively operable so the fuel level does not drop generally below a second predetermined level of fuel within the delivery fuel tank, the low-pressure fuel pump and high-pressure fuel pump being independently operable.

2. The outboard motor of claim 1, wherein the low-pressure fuel pump is an electrically driven pump.

3. The outboard motor of claim 2, wherein the low-pressure fuel pump is an on/off pump.

4. The outboard motor of claim 1, wherein the delivery fuel tank includes at least one sensor that produces a signal in response to the fuel level.

5. The outboard motor of claim 4, wherein a control unit receives the signal and controls the low-pressure fuel pump based on the signal.

6. The outboard motor of claim 5, wherein the at least one sensor includes a high-level sensor that produces a signal based on the fuel level in the delivery tank.

7. The outboard motor of claim 6, wherein the control unit turns the low-pressure fuel pump off if the signal produced by the high-level sensor indicates that the fuel level is generally higher than the first predetermined level of fuel.

8. The outboard motor of claim 6, wherein the control unit turns the low-pressure fuel pump on if the signal produced by the high-level sensor indicates that the fuel level is generally lower than the first predetermined level of fuel.

9. The outboard motor of claim 4, wherein the at least one sensor includes a low-level sensor that produces a signal based on the fuel level in the delivery fuel tank.

10. The outboard motor of claim 9, wherein a control unit receives the signal and controls the high-pressure fuel pump based on the signal.

11. The outboard motor of claim 10, wherein the control unit turns the high-pressure fuel pump on if the signal produced by the low-level sensor indicates that the fuel level is generally higher than the second predetermined level of fuel.

12. The outboard motor of claim 11, wherein the control unit turns the high-pressure fuel pump off if the signal produced by the low-level sensor indicates that the fuel level is generally lower than the second predetermined level of fuel.

13. The outboard motor of claim 4, wherein the outboard motor includes an angle detection sensor that produces an angle signal in response to the angle of the delivery fuel tank.

14. The outboard motor of claim 13, wherein the outboard motor includes a control unit that receives the angle signal and controls the low-pressure pump and the at least one sensor based on the angle signal.

15. The outboard motor of claim 13, wherein the control unit deactivates the at least one sensor when the delivery fuel tank is angled generally above a predetermined angle and activates the at least one sensor when the delivery fuel tank is angled generally below the predetermined angle.

16. An outboard motor for a watercraft, the motor comprising a cowling member and an internal combustion engine carried by the cowling member, a delivery fuel tank, which contains fuel for operation of the engine, carried by the cowling member, an external supply fuel tank, a low-pressure fuel pump adapted to communicate with the external supply fuel tank and in fluid communication with the delivery fuel tank to deliver fuel from the external supply tank to the delivery fuel tank, a high-pressure fuel pump in fluid communication with the delivery fuel tank for pumping fuel from the delivery fuel tank to the engine, first means for selectively operating the low-pressure fuel pump to maintain a fuel level generally lower than a first predetermined level of fuel in the delivery fuel tank, and second means for selectively operating the high-pressure fuel pump so the fuel level does not drop generally below a second predetermined level of fuel in the delivery fuel tank.

17. The outboard motor of claim 16, wherein the first means operates the low-pressure fuel pump when the fuel level in the delivery fuel tank falls generally below the first predetermined level.

18. The outboard motor of claim 16, wherein the first means deactivates the low-pressure fuel pump when the fuel level in the delivery fuel tank rises generally above the first predetermined level.

19. The outboard motor of claim 16, wherein the second means operates the high-pressure fuel pump when the fuel level in the delivery fuel tank rises generally above the second predetermined level.

20. The outboard motor of claim 16, wherein the second means deactivates the high-pressure fuel pump when the fuel level in the delivery fuel tank falls generally below the second predetermined level.

21. An outboard motor for a watercraft, the motor comprising a power head having an internal combustion engine, a delivery fuel tank, which contains fuel for operation of the engine, carried by the outboard motor, a fuel supply system including a high-pressure fuel pump which supplies fuel to the engine from the delivery fuel tank, and a control system which controls the high-pressure fuel pump so that a fuel level in the delivery fuel tank does not fall generally below a predetermined level.

22. The outboard motor of claim 21, wherein the control system includes a logic circuit and at least one sensor, the at least one sensor detects a condition of the outboard motor and produces a signal in response to the condition, the logic circuit receives the signal and controls the high-pressure fuel pump based on the signal.

23. The outboard motor of claim 22, wherein the at least one sensor includes a fuel level sensor that produces a fuel level signal based on the fuel level in the delivery fuel tank.

24. The outboard motor of claim 23, wherein the at least one sensor also includes an angle sensor that senses a tilt angle of the delivery fuel tank and produces an angle signal based on the tilt angle.

25. The outboard motor of claim 23, wherein the logic circuit receives the angle signal and controls the fuel level sensor based on the angle signal.

26. A method for controlling a level of fuel in a fuel tank of an outboard motor, the method comprising:

providing a low-pressure fuel pump in the outboard motor for supplying fuel to the fuel tank;

detecting the fuel level in the fuel tank;

activating the low-pressure fuel pump when the fuel level detected in the fuel tank falls generally below a predetermined maximum fuel level; and deactivating the low-pressure fuel pump when the fuel level detected in the fuel tank rises generally above the predetermined maximum fuel level.

27. The method of claim 26, further comprising detecting an angle of the fuel tank and deactivating the low-pressure fuel pump if the angle is generally greater than a predetermined maximum angle.

28. The method of claim 26, further comprising:

providing a high-pressure fuel pump in the outboard motor for delivering fuel from the fuel tank to an engine of the outboard motor, detecting the fuel level in the fuel tank, activating the high-pressure fuel pump when the fuel level in the fuel tank rises generally above a predetermined minimum fuel level, and deactivating the high-pressure fuel pump when the fuel level in the fuel tank falls generally below the predetermined minimum fuel level.

29. A method for controlling a level of fuel in a fuel tank of an outboard motor, the method comprising:

providing a high-pressure fuel pump in the outboard motor for delivering fuel from the fuel tank to an engine of the outboard motor;

detecting the fuel level in the fuel tank;

activating the high-pressure fuel pump when the fuel level in the fuel tank rises generally above a predetermined minimum fuel level; and, deactivating the high-pressure fuel pump when the fuel level in the fuel tank falls generally below the predetermined fuel level.

* * * * *